United States Patent
Smith et al.

(10) Patent No.: US 6,313,449 B1
(45) Date of Patent: Nov. 6, 2001

(54) FUSION JOINING APPARATUS

(75) Inventors: Cin Smith, Mountain View; Goran Perica, Menlo Park; Randy J. Bleske, San Jose; Steve Kinney, Sunnyvale, all of CA (US)

(73) Assignee: Uponor Aldyl Company, Hockessin, DE (US)

( * ) Notice: Subject to any disclaimer, the term of this patent is extended or adjusted under 35 U.S.C. 154(b) by 0 days.

(21) Appl. No.: 09/423,955

(22) PCT Filed: May 15, 1998

(86) PCT No.: PCT/GB98/01408

§ 371 Date: Jul. 10, 2000

§ 102(e) Date: Jul. 10, 2000

(87) PCT Pub. No.: WO98/53242

PCT Pub. Date: Nov. 26, 1998

Related U.S. Application Data

(63) Continuation of application No. 08/857,230, filed on May 16, 1997, now abandoned, which is a continuation of application No. 08/857,876, filed on May 16, 1997, now Pat. No. 5,908,575.

(51) Int. Cl.[7] .............................. H05B 6/10; H02M 5/00
(52) U.S. Cl. ............................................ 219/633; 363/157
(58) Field of Search ..................... 363/157, 159, 363/163, 164, 165; 219/108, 110, 611, 633, 643, 660, 661; 285/284, 288

(56) References Cited

U.S. PATENT DOCUMENTS

| | | |
|---|---|---|
| 4,032,740 | 6/1977 | Mittlemann ........................ 219/10.77 |
| 4,521,659 | 6/1985 | Buckley et al. .................... 219/10.77 |
| 4,554,430 * | 11/1985 | Belamaric ............................. 219/108 |
| 4,918,292 | 4/1990 | Nussbaum et al. ..................... 219/492 |
| 5,138,136 | 8/1992 | Moreau et al. ........................ 219/505 |
| 5,414,247 | 5/1995 | Geithman et al. ...................... 219/667 |
| 5,466,916 | 11/1995 | Iguchi et al. .......................... 219/633 |
| 5,601,741 | 2/1997 | Thommes ......................... 219/130.21 |
| 5,751,568 * | 5/1998 | Danjo et al. ............................. 363/95 |

FOREIGN PATENT DOCUMENTS

| | | | |
|---|---|---|---|
| 2-196629 | 8/1990 | (JP) | ............................... B29C/65/02 |
| 6-284736 | 10/1994 | (JP) | ............................... B29C/65/32 |
| 7-323479 | 12/1995 | (JP) | ............................... B29C/65/34 |
| 8-258153 | 10/1996 | (JP) | ............................... B29C/65/34 |
| 9-24548 | 1/1997 | (JP) | ............................... B29C/65/34 |

* cited by examiner

*Primary Examiner*—Matthew Nguyen
(74) *Attorney, Agent, or Firm*—Fish & Richardson P.C.

(57) ABSTRACT

A fusion joining apparatus includes an electrical power source, a first frequency converter coupled to the electrical power source, a connector for connection to an induction fusion heater, a second frequency converter and a controller. During operation, the electrical power source generates source electrical power at a source voltage and a source frequency. The first frequency converter steps up the voltage and the frequency of the source electrical power to produce high voltage electrical power. The second frequency converter reduces the voltage and frequency of the high voltage electrical power and produces low voltage electrical power. The second frequency converter has terminals for connection to a resistance fusion heater to provide the low voltage electrical power to the resistance fusion heater. The controller includes a processor which selects one of the second frequency converter and the connector and a switch to direct the high voltage electrical power to the selected one of the second frequency converter and the connector.

22 Claims, 2 Drawing Sheets

FUSION JOINING APPARATUS

This application is a 371 of PCT/GB98/01408 filed May 15, 1998, which is a continuation of 08/957230 filed May 15, 1997 now abandoned, which is a continuation of 08/857,876 filed May 16, 1997 now U.S. Pat. No. 5,908,575.

BACKGROUND

This invention relates to power supply apparatus for a fusion joining apparatus, which supply is capable of flexible application and convenient use.

Many different methods and apparatuses exist for fusion joining polyethylene pipe, such as with electrofusion fittings or induction fusion fittings. In conventional electrofusion methods, a pipe coupling or other fitting normally has a wire coil moulded within the coupling or other fitting. Electrical leads, contacts or electrodes are often mounted on an external portion of the coupling body, for electrical contact access. In a typical conventional electrofusion procedure for axially joining two pipes, each pipe end portion is cleaned (for example by scraping) and then positioned within a coupling. A clamp is often used to secure or hold the pipe with respect to the coupling. Power is supplied directly to a wire coil moulded within the coupling. The wire coil then transfers heat generated by resistance heating to the polyethylene material and fuses the coupling material directly to the pipe material.

In conventional induction fusion procedures, a heater element is moulded within the coupling or other fitting. The coupling provides no direct access to external contacts or electrodes electrically connected to the heater element. Current flow through the heater element is generated by induction from a primary coil within an application tool that is positioned around the coupling or other fitting. Normally, a high frequency current is delivered to the application tool for a predetermined time period. A primary coil within the application tool is energised and then induces a secondary current within the heater element. The temperature of the heater element increases to a generally constant value and then the polyethylene or other plastics material surrounding the heater element fushion bonds the polyethylene or other plastics material of the pipe and the coupling or other fitting.

The use of induction heating in heat fusion fittings is disclosed, for example, in Ser. No. WO080/02124.

In many conventional processes associated with either electrofusion or induction fusion heating, the power delivered to the wire coil of an electrofusion fitting or a heater element of an induction fusion fitting, necessitates relatively heavy gauge or large cables that must be relatively short, due to the high current and high frequency power waveform transmitted through the cables. Thus, it is often necessary to position the power source relatively close to an installation site or fusion site. Quite often significant amounts of labour and time are necessary to deliver power requirements demanded by the installation tool.

SUMMARY

There is an apparent need for apparatus that can be more conveniently used at an installation site or a fusion site, and accordingly it is one object of this invention to provide apparatus for fusion joining polyethylene or other plastics material pipe, using a power source that can be remotely located with respect to a fusion site, and/or wherein a variety of power sources can be used to supply input power, and/or which houses a power supply, a frequency converter and/or a controller within a relatively small and lightweight housing that can be easily moved to a fusion site or which otherwise mitigates the disadvantages of the prior art, or at least reduces their effects.

In accordance with the present invention there is provided fusion joining apparatus comprising:
 an electrical power source;
 a first frequency converter to step up the voltage of said power source and its frequency;
 a controller comprising a processor and a switch to switch the output of the converter between, on the one hand, a second frequency converter to reduce the voltage and frequency of said output for connection to a resistance fusion heater and, on the other hand, a connector for connection of an induction fusion heater.

Preferably, a first frequency converter increases the frequency of said power source to at least 300 kHz. Preferably, said frequency converter and controller are mounted in first and second housings. Preferably separate housings are interconnected by a low current, high frequency cable. Preferably, said housings have a respective plug and socket for mutual interconnection. Preferably, said cable has a plug and socket adapted to fit the respective plug and socket on the housings. Preferably said frequency converter comprises sockets to receive said power source in the form of an AC adaptor providing a DC voltage or a battery. Preferably, the controller further comprises input means to notify the processor of the fusion heater to be energized. Preferably, said input means comprises a barcode reader connected to said processor and adapted to read barcodes provided on fusion heaters. Preferably, said input means comprises a key pad by means of which identification of said fusion heater may be input by a user. Preferably the apparatus further comprises an ambient temperature sensor so that the processor can calculate fusion duration.

Preferably the frequency of the input power from the electrical power source is in the range of 0 hz to about 75 hz.

Preferably said first frequency converter increases the frequency of said power source to a frequency in the range of 380 kHz to 420 kHz.

By housing the processor (also described herein as a controller) in a housing that can be easily transported, a relatively short output cable can be connected between the housing and the fusion tool while a relatively long, lighter gauge cable can be used as the connector to deliver power from the power source to the tool.

Because the input is delivered at a relatively high frequency and relatively low current, the input cables can be relatively lightweight and of a lighter gauge. Thus, the input power can be delivered through inexpensive and low maintenance cables.

With the apparatus according to one preferred embodiment of this invention, the power source and the generator can be remotely located at or near a truck, a building or any other remote location that offers a suitable power source. Alternatively, where the power source comprises a battery pack, the pack and generator can be locally positioned with respect to the fusion tool.

Although the apparatus according to this invention is particularly suitable for fusion joining polyethylene pipe, it is apparent that the apparatus can be used to join other plastic or non-plastic pipes, couplings or even other shapes of pipe fittings, plates or any other suitable materials that require fusion joining.

The apparatus of this invention provides a system that operates at a relatively low cost and is easy to handle in the field, for installing and repairing polyethylene service pipes, such as those transmitting natural gas, water or even communications conduits, such as optic fibre carriers etc. The apparatus of this invention can be easily adapted to fuse: low and high volume T-fittings, such as those in a range of approximately 32 mm to 200 mm, for electrofusion service; service outlets, such as those in a range of approximately 10 mm to 50 mm for induction fusion or electrofusion service; and relatively smaller couplers, such as those in a range of approximately 10 mm to 50 mm for induction fusion or electrofusion service. However, the application of the present invention is not restricted to the gas industry. The water industry also employs plastics components with increasing regularity, as does the communications industry.

DESCRIPTION OF THE DRAWINGS

The above-mentioned and other features and objects of this invention will be better understood from the followed detailed description of the present invention taken in conjunction with the drawings wherein.

DETAILED DESCRIPTION

Figure 1:
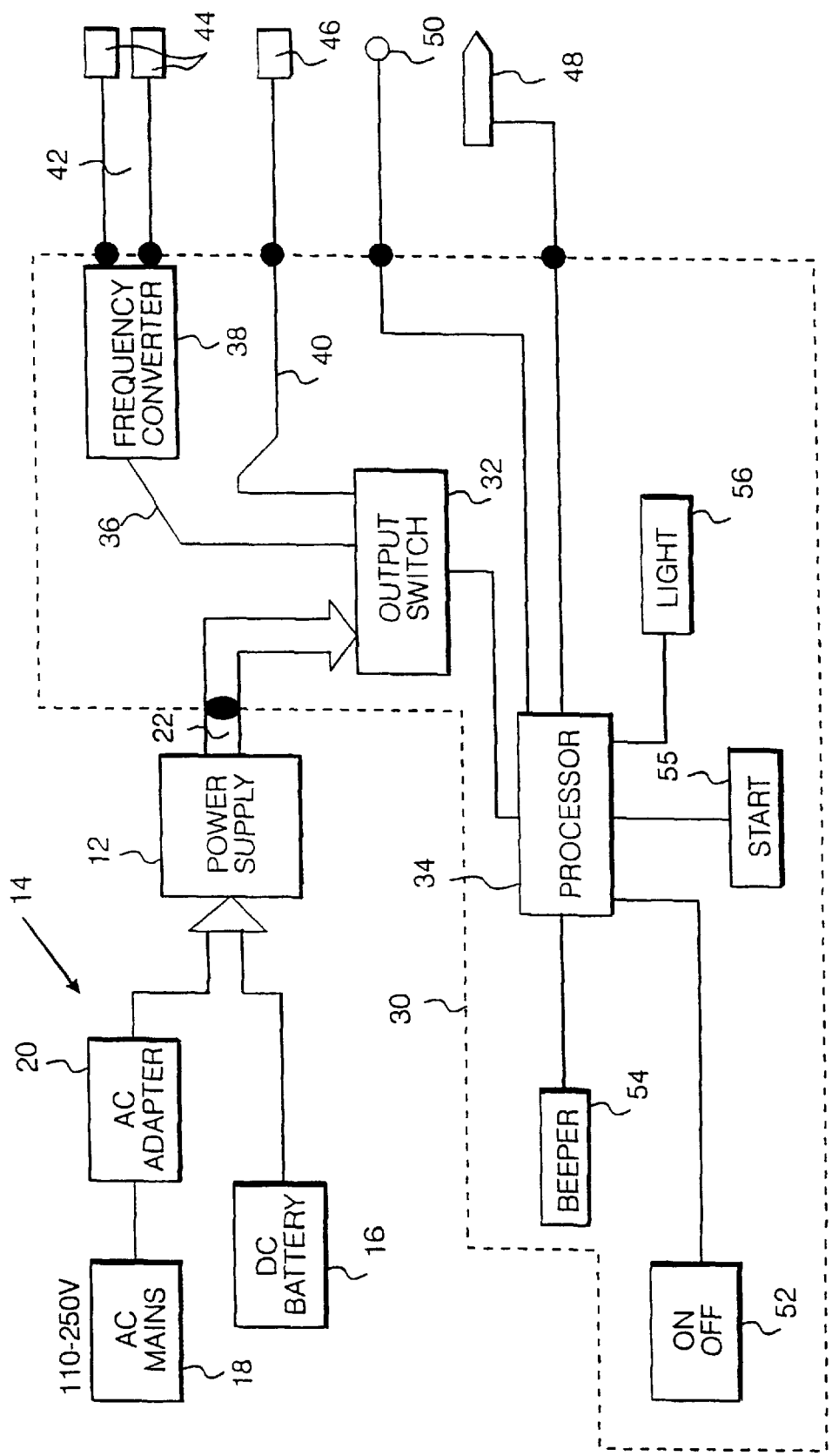
FIG. 1 is a block diagram of apparatus for fusion joining plastics pipe.

In the drawings fusion joining apparatus (10) comprises a power supply (12). The power supply comprises a high frequency generator which is powered by a low voltage, low frequency source (14). The source (14) may comprise either a DC battery (16) or an AC mains voltage supply (18) and an AC adaptor (20). A third source (not shown) may comprise a generator, which, in normal industrial situations, is equivalent to an AC mains supply.

In any event, the output of the power supply (12) is a high frequency signal in the range 380 to 420 kHz with a voltage of about 500 volts and a current of about 7 amps. Such an output at (22) is capable of transmission over a substantial distance of 75 m or more and the transmission cable can be of relatively light gauge.

Supply (22) is fed to a controller (30), in particular an output switch (32) thereof. The output switch (32) is under the control of a processor (34) which routes the supply from line (22) to one of lines (36) to a frequency converter (38) and line (40). Frequency converter (38) converts the signal from power supply (12) into a generally constant voltage in the range between about 20 volts and 48 volts and a power in the range 2 kw to 3.5 kw. Such a power supply is suitable for conventional electrofusion fittings. However, because the electrical supply is direct current, cables (42) from the controller (30) to electrofusion terminals (44) need to be both short and heavy duty in order to reduce power losses.

If the supply (22) is fed directly to line (40), however, this is connected to an induction heating tool (46) which operates at the frequency, voltage and current supplied by power supply (12).

The processor (34) determines which line (36, 40) the power is supplied to, and this depends on which kind of fusion fitting is being employed. Such information could be communicated to the processor by any convenient means. However, FIG. 1 shows a barcode reader or wand (48) adapted to read the barcodes provided on most electrofusion fittings. The information from the wand (48) is fed to the processor, on the basis of which the selection at the output switch (32) is made, as well as the duration of the supply to the relevant line (36, 40). Indeed, the processor may also control the frequency converter (38) so that the appropriate voltage and current is delivered to the terminals (44).

Likewise, a temperature sensor (50) is provided connected to the controller (30) and which measures ambient temperature in the environment of the fusion coupler, and on the basis of which the processor controls the duration of fusion.

Other functions are also connected to the processor, such as an on/off switch (52), a beeper (54), a start button (55), a light (56) and other devices (not shown) such as, for example, a display.

Figure 2:
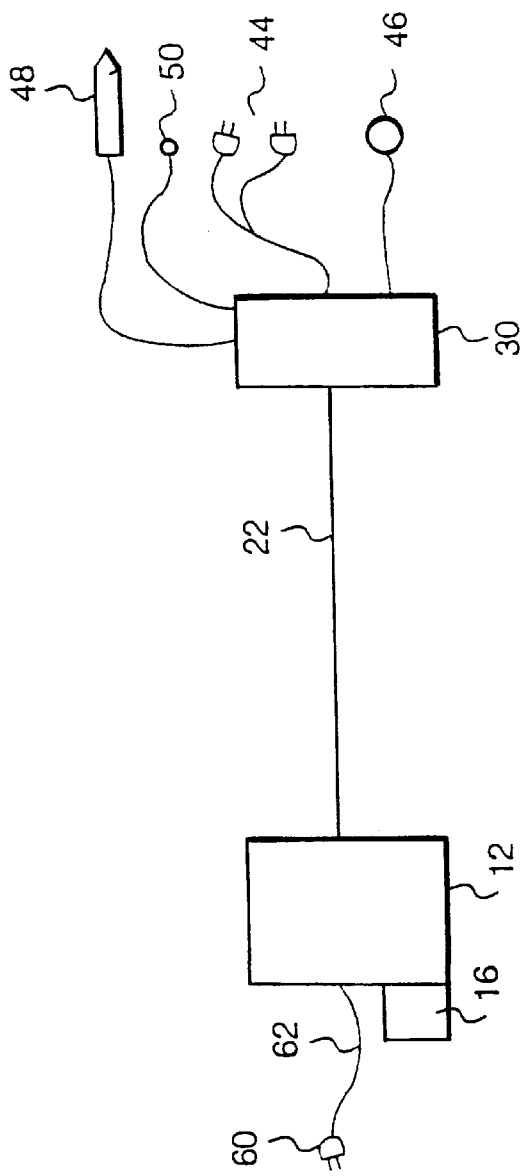
FIG. 2 is a schematic diagram of the apparatus of FIG. 1, wherein a power source is remote from a tool.
Figure 3:
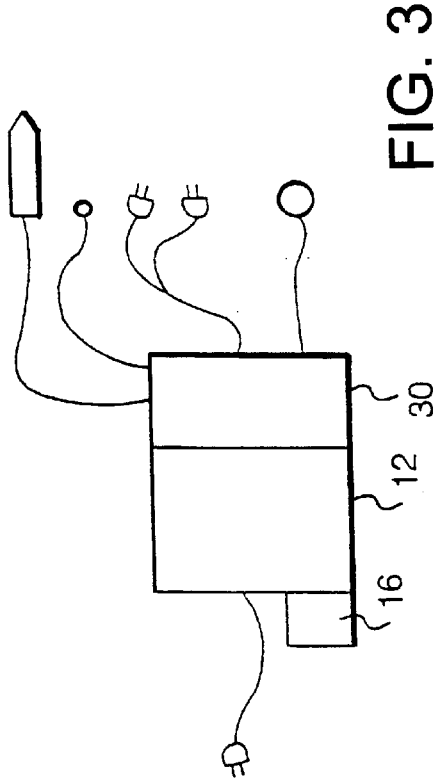
FIG. 3 is as FIG. 2 except for a local power source.

With reference to FIGS. 2 and 3, the power supply (12) is preferably provided in one housing and the controller (30) is provided in another housing. Where the power source is mains power, or a generator, then a plug (60) on the end of a short cable (62) may supply the power supply (12) which would therefore be located adjacent the socket outlet of the mains supply or generator, as the case may be. On the other hand, the controller (30) is located close to the scene of application, probably in a trench or the like. Wand (48), sensor (50), terminals (44) and tool (46) are all connected to the controller (30) by relatively short cables. Between the two housings (12, 30) a long, light gauge cable (22) connects the power supply to the controller.

On the other hand, where the power supply is a DC battery (16), then there is no need for the power supply (12) to be located in any particular place. Therefore the cable (22) can be dispensed with and the housing (12) connected directly to the controller (30). Indeed, each may be provided with the respective mating connectors to enable such connection. Depending on the size of the fusion couplers, as many as about 30 fusions may be achieved with a rechargeable battery (16).

Said power supply (12) comprises a first frequency converter, whereas the frequency converter (38) comprises a second frequency converter.

What is claimed is:

1. Fusion joining apparatus comprising:
    an electrical power source which during operation provides electrical power at a voltage and a frequency;
    a first frequency converter to step up the voltage and the frequency of said electrical power producing an output;
    a controller comprising a processor and a switch to switch the output of the first frequency converter between, on the one hand, a second frequency converter to reduce the voltage and frequency of said output for connection to a resistance fusion heater and, on the other hand, a connector for connection of an induction fusion heater.

2. Apparatus as claimed in claim 1 in which said first frequency converter increases the frequency of said power source to at least 300 kHz.

3. Fusion apparatus as claimed in claim 1 in which said first frequency converter and controller are mounted in first and second housings, respectively.

4. Apparatus as claimed in claim 3 in which said separate housings are interconnected by a low current, high frequency cable.

5. Apparatus as claimed in claim 3 in which said housings have a respective plug and socket for mutual interconnection.

6. Apparatus as claimed in claim 4, in which said cable has a plug and socket adapted to fit the respective plug and socket on the housings.

7. Apparatus as claimed in claim 1, in which said frequency converter comprises sockets to receive said power source in the form of an AC adapter providing a DC voltage or a battery.

8. Apparatus as claimed in claim 1, in which the controller further comprises input means to notify the processor of which of the second frequency converter and the converter for connection of the induction fusion heater is to receive the output of the first frequency converter.

9. Apparatus as claimed in claim 8, in which said input means comprises a barcode reader connected to said processor and adapted to read barcodes provided on fusion heaters.

10. Apparatus as claim 8, in which said input means comprises a key pad by means of which identification of the fusion heater may be input by a user.

11. Apparatus as claimed in claim 2 further comprising an ambient temperature sensor so that the processor can calculate fusion duration.

12. Apparatus as claimed in claim 1 wherein the frequency of the input power from the electrical power source is in the range 0 Hz to about 74 Hz.

13. Apparatus as claimed in claim 1 in which said first frequency converter increases the frequency of said power source to a to a frequency in the range 380 kHz to 420 kHz.

14. Fusion apparatus as claimed on claim 2 in which said first frequency converter and controller are mounted in first and second housings, respectively.

15. Apparatus as claimed in claim 14 in which said separate housings are interconnected by a low current, high frequency cable.

16. Apparatus as claimed in claim 4 in which said housings have a respective plug and socket for mutual interconnection.

17. Apparatus as claimed in claim 14 in which said housings have a respective plug and socket for mutual interconnection.

18. Apparatus as claimed in claim 15 in which said housings have a respective plug and socket for mutual interconnection.

19. Apparatus as claimed in claim 5, in which said cable has a plug and socket adapted to fit the respective plug and socket on the housings.

20. Apparatus as claimed in claim 16 in which said cable has a plug and socket adapted to fit the respective plug and socket on the housings.

21. Apparatus as claimed in claim 17 in which said cable has a plug and socket adapted to fit the respective plug and socket on the housings.

22. Fusion joining apparatus comprising:

an electrical power source which during operation generates source electrical power at a source voltage and a source frequency;

a first frequency converter coupled to the electrical power source, said first frequency converter stepping up the voltage and the frequency of said source electrical power to produce high voltage electrical power;

a connector for connection to an induction fusion heater;

a second frequency converter to reduce the voltage and frequency of the high voltage electrical power and produce low voltage electrical power, said second frequency converter having terminals for connection to a resistance fusion heater to provide the low voltage electrical power to the resistance fusion heater; and a controller including:

a processor which selects one of the second frequency converter and connector; and a switch to direct the high voltage electrical power to the selected one of the second frequency converter and the connector.

* * * * *